United States Patent [19]

Couderc et al.

[11] 4,287,412
[45] Sep. 1, 1981

[54] PHOTOELECTRIC DIRECTION FINDER

[75] Inventors: Georges Couderc; Yves Cojan; Denis Bargues, all of Paris, France

[73] Assignee: Thomson-CSF, Paris, France

[21] Appl. No.: 96,112

[22] Filed: Nov. 20, 1979

[30] Foreign Application Priority Data

Nov. 24, 1978 [FR] France ................................ 78 33289

[51] Int. Cl.³ ................................................ G01J 1/20
[52] U.S. Cl. .................................. 250/203 R; 356/152
[58] Field of Search ............... 250/201, 203 R, 237 G; 356/141, 152

[56] References Cited

U.S. PATENT DOCUMENTS

| 4,112,294 | 9/1978 | Pressiat | 250/237 G |
| 4,129,775 | 12/1978 | O'Meara | 356/152 |
| 4,134,008 | 1/1979 | De Corlieu | 250/203 R |

Primary Examiner—David C. Nelms
Attorney, Agent, or Firm—Edwin E. Greigg

[57] ABSTRACT

A photoelectric direction finder in which the modulating and spatial filtering functions produced by the reticles are separated from the deviation measurement function resulting from a four quadrant detection, provided with a view to permitting a passive or semi-active bimodal operation. The reticles are determined transparent for the radiation emmited by an auxiliary laser illuminator modulated according to a modulation different from that provided by the reticles in the passive mode, while the processing and deviation measurement circuits have additional laser signal demodulation circuits and automatic or priority mode selection and switching circuits.

10 Claims, 8 Drawing Figures

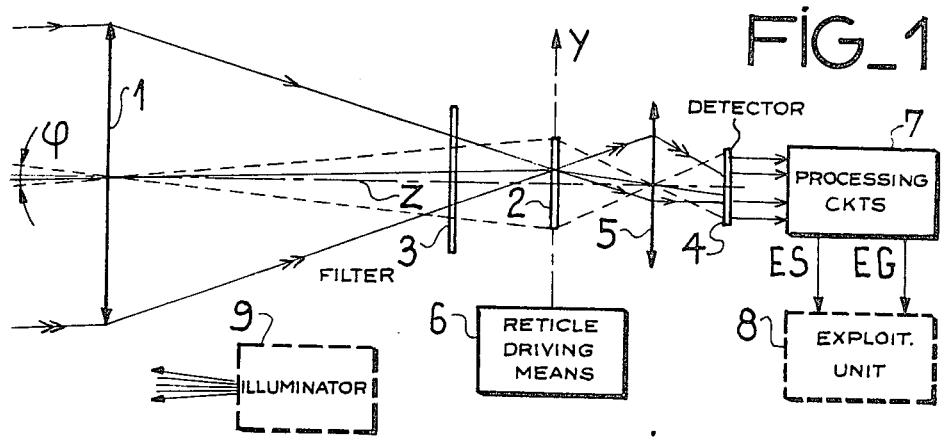
FIG_1
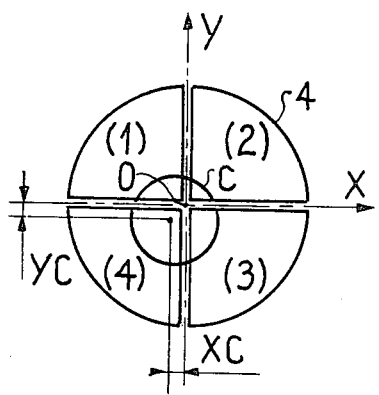
FIG_2
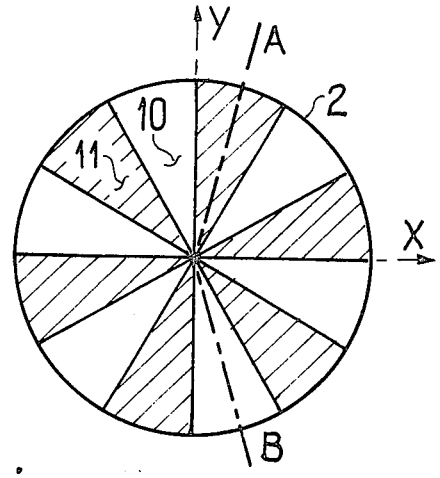
FIG_3
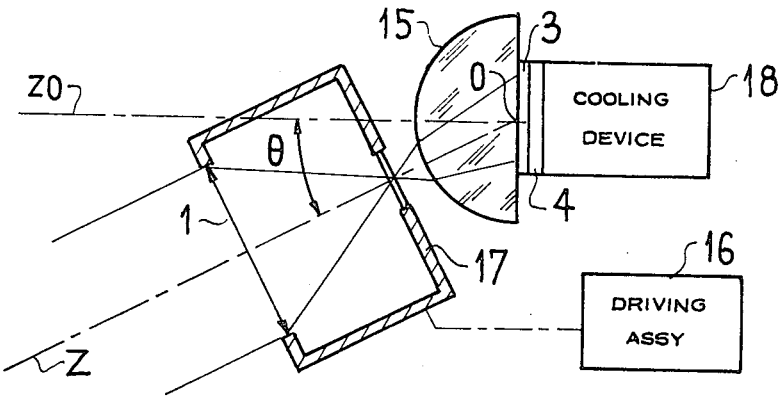
FIG_4

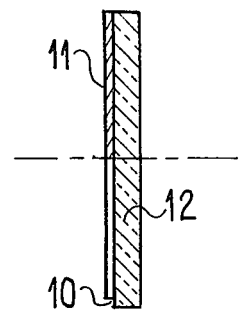
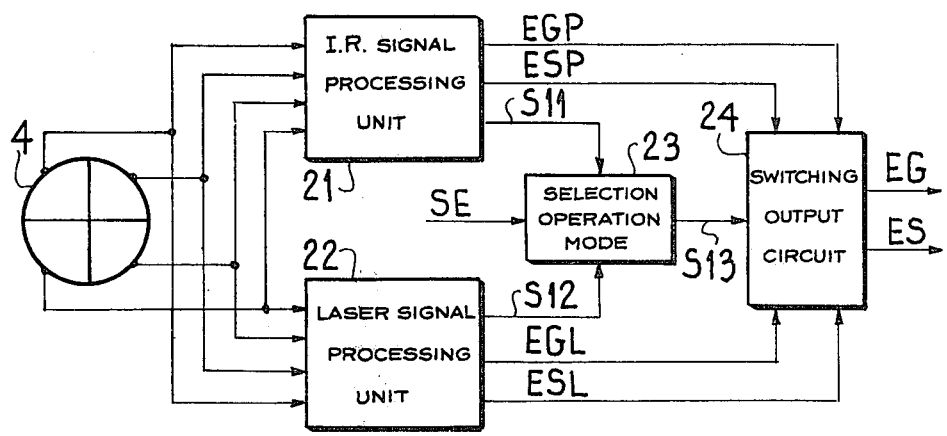
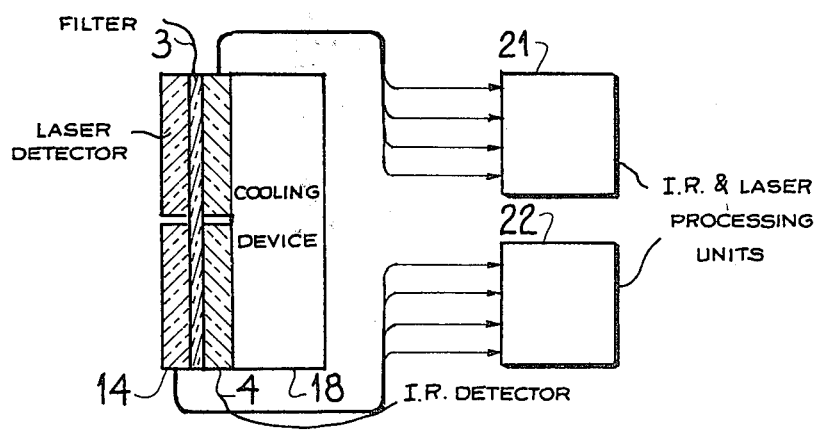

PHOTOELECTRIC DIRECTION FINDER

BACKGROUND OF THE INVENTION

The present invention relates to improvements to photoelectric direction finders in which the modulating and spatial filtering functions due to movable reticles are separate from the deviation measurement function.

A system of this type is described in U.S. Pat. application Ser. No. 19697. The reticles are such that there is a modulation of the reception beam at a desired frequency. A four quadrant detector is used. An intermediate optical means, called the deviation measurement means, are placed between the reticles located in the focal plane of the reception optical means and the detector in such a way as to form an image spot of a certain diameter on the photosensitive detection plane. This arrangement makes it possible to mechanically decouple the reticles—reception optical means assembly from the optical deviation measurement—detector assembly located downstream. More particularly, through using a deviation measurement optical means of the half-ball type, whose centre of curvature essentially coincides with the centre of the four quadrant detector, it is possible to produce a relative movement of the reticles with respect to the detector by rotation about the said centre. This system is advantageously applied to the construction of a passive infrared homing apparatus.

BRIEF SUMMARY OF THE INVENTION

The improvements forming the subject matter of the present invention relate to obtaining a semi-active or passive, bimodal operation for the system in place of a passive operation only.

In passive operation, the modulation of the signal is produced by the rotational movement of the support of the modulating and spatial filtering reticles.

In semi-active operation, the modulation of the signals is produced at the attached light radiator, generally a laser, which illuminates the target to be detected. The laser can be of the pulsed or continuous emission type.

According to a distinctive feature of the present invention provision is made for a photoelectric direction finder of the type comprising an optical reception and focussing objective, a rotary disk rotated in the focal plane of the objective and provided with reticles formed from transparent and opaque zones for producing a modulation whose frequency is linked with the rotation speed, an optical filter, a photodetector device for the modulated radiation and circuits for the processing and deviation measurement of the detected signals, comprising demodulating circuits and producing deviation signals which are representative of the angular offsetting of the target relative to the optical axis and in which an intermediate, deviation measurement objective is positioned between the reticles and the detector, the latter being of the four quadrant type for producing the deviation signals from the respective signals of the quadrants and consecutively separating the deviation measurement function from the modulating and spatial filtering functions produced by the reticles. Said photoelectric direction finder is distinguished by the fact that the reticles are completely transparent to the radiation produced by an attached laser illuminator modulated with a modulation which is separate from that produced by the reticles and that it has additional processing circuits for processing the detected laser signals, as well as circuits for switching and selecting passive and semi-active operating modes for obtaining the corresponding deviation measurement data.

BRIEF DESCRIPTION OF THE DRAWINGS

The invention will be described in greater detail hereinafter relative to non-limitative embodiments and with reference to the attached drawings, wherein show:

FIGS. 1 to 4 diagrams of a photoelectric direction finder of the type concerned by the invention, showing respectively a general simplified diagram, a diagram of the photoelectric detector used, an exemple of embodiment of the modulating and spatial filtering reticles and a simplified partial diagram of the system for producing a relative rotation between the reticles and the detector.

FIG. 5 a section of the disk according to FIG. 3 arranged according to the invention.

FIG. 7 a general diagram of a second embodiment of the electronic circuits.

FIG. 8 a constructional variant of the detector according to FIGS. 2 and 4.

DETAILED DESCRIPTION OF THE PREFERRED EMBODIMENTS

Figure 6:
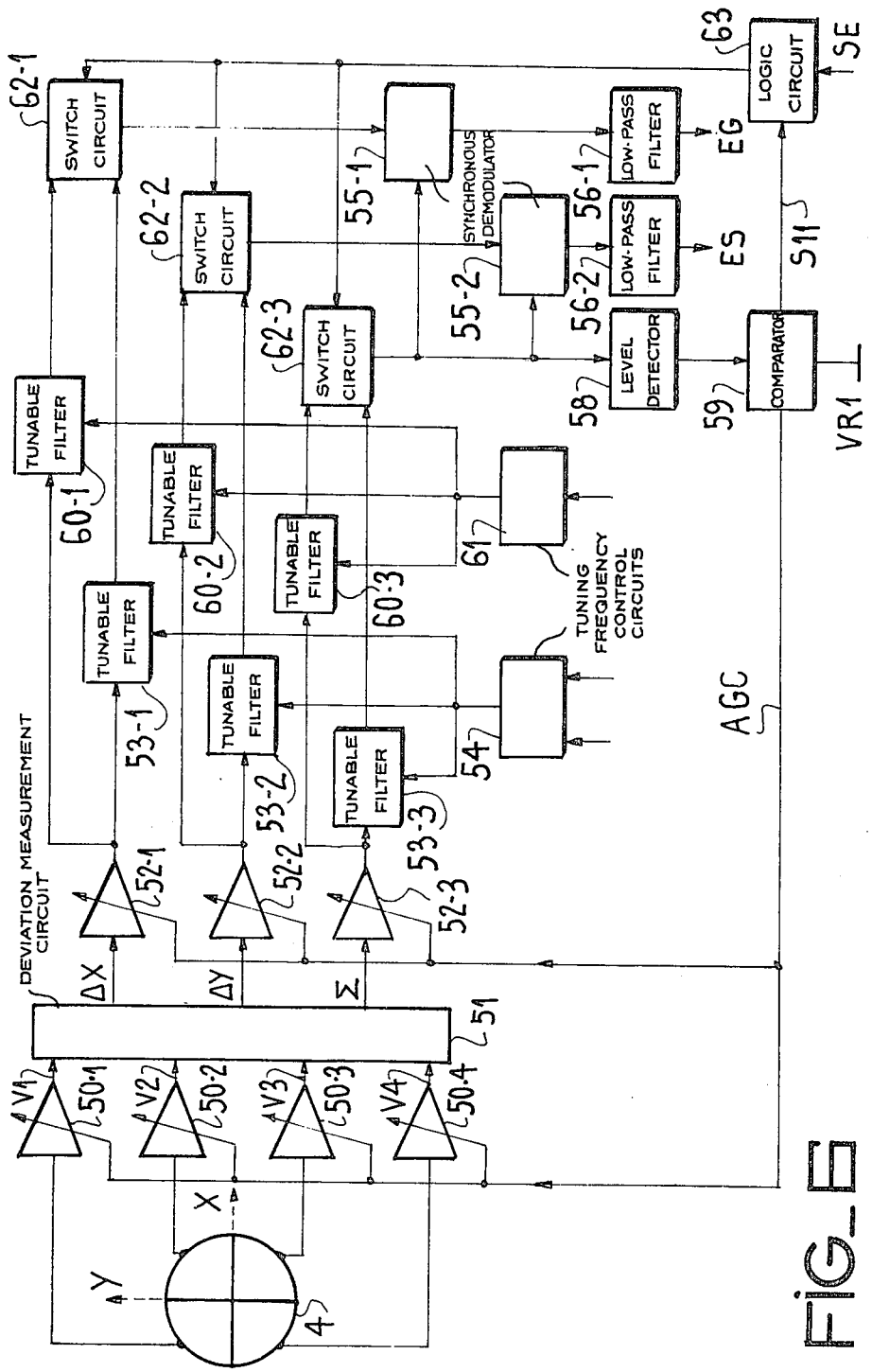
FIG. 6 a detailed diagram of an embodiment of electronic processing and deviation measurement circuits according th the invention.

A photoelectric direction finder of the type according to the present invention is described hereinafter relative to FIGS. 1 to 3.

In the general diagram of FIG. 1, it is possible to see the essential elements of the combination forming the detection and location system. These elements comprise an optical reception objective 1, symbolised by a lens, which provides the focussing of the radiation received in the observed field of aperture $\phi$ centered on the optical axis Z, a sweep device with reticles 2 located substantially in the focal plane of the objective and producing the spatial filtering and modulationg functions, an optical filter 3 located in the path of the rays for filtering the radiation included in the useful band used and a photoelectric detector device 4. The latter is placed at a distance from the plane of the reticles and an intermediate optical objective 5 transposes the field image to a plane close to that of the detection plane for producing an image spot of given diameter on the detection plane. Block 6 symbolises a drive device for reticles 2.

The detector device 4 is of the four quadrant detector type said quadrants being respectively connected to reception circuits 7 having four input channels. The detector signals are demodulated as a function of the modulation created by the reticles and are processed by summation and subtraction to produce deviation measurement signals corresponding to the elevation deviation ES and the bearing deviation EG of the target relative to the optical line of sight Z. They are transmitted to an auxiliary operating unit 8. The detector with four quadrants (1) (2) (3) (4) is shown for information purposes in FIG. 2. The deviation measurement signals ES and EG respectively correspond to the coordinates YC and XC of the centre of the target image spot C relative to the reference cartesian axes OX and OY. Point O, which is the centre of the detector, corresponds to the line of the optical axis Z perpendicular to the detector plane.

The movable reticles 2 can be in the form of one or more circular tracks carrying opaque and transparent zones of direction Y and displaced in the transverse direction X to produce one or more corresponding modulations of the focused beam. Without prejudice to the invention and in order to simplify the description, it is assumed hereinafter that the support for the reticles is a disk centered on the optical axis, said version being more compact and more easily integratable into a homing apparatus system. For the same reason, it is assumed that the disk has, in the manner shown in FIG. 3, a single track formed from transparent sectors 10 and opaque sectors 11, which alternate and are of the same size for modulating the beam at a frequency F1, which is dependent on the number of sectors and the instantaneous rotation speed about axis Z.

FIG. 4 shows an arrangement of the system permitting the advantageous utilisation of the separation of the functions, which permits a mechanical deoupling between the reticles-reception optical means and the detector-intermediate optical means. The intermediate optical means or deviation measurement means are designed in such a way as to preserve the same transposition function of the image when the relative position between the above means is modified by a rotational movement about the centre O of the detector plane. The deviation measurement optical means are realised in the form of a plano-convex lens 15, called a half-ball, whose centre of curvature of the convex face coincides with the instantaneous centre of rotation O and whose planar face constitutes a diametral plane or essentially of the corresponding sphere centered at O.

This arrangement permits a large spatial angular difference $\theta$ between the optical axis Z and axis ZO perpendicular to the detection plane at O. The relative movement is produced by drive means 16 of one of the parts relative to the other. In the present embodiment, system 1-2 is coupled by a mechanical structure 17, which is rotated about point O to produce the desired offset $\theta$ between axes Z and ZO. Furthermore, reticles 2 are rotated about axis Z and device 16 can be designed so as to additionally produce said rotation by the driving of system 1-2 by structure 17.

According to this arrangement, the luminous flux from the target is constant at the detection level and the signals detected on each quadrant of detector 4 are independent of the offset $\theta$ and the deviation measurement remains unchanged.

Within the scope of application to a homing apparatus, the assembly formed by objective 1 and reticles 2 is advantageously fixed to the rotary, spinning part of a gyroscope, detector 4 and filter 3 being fixed to the central gimbal of the gyroscope. A cryostat 18 makes it possible to cool the detector and the filter. A corresponding constructional embodiment is described in U.S. application Ser. No. 19697, to which reference can be made for details.

The improvements provided by the invention to the system of FIGS. 1 to 3 or according to FIG. 4 in order to permit a passive or semi-active bimodal operation are described hereinafter.

In order to permit a semi-active operation, a conventional auxiliary light source, called an illuminator is provided in order to illuminate the object or target to be detected. This source is advantageously constituted by a laser and is symbolised by block 9 in FIG. 1. The emission of light takes place in a given wavelength or in a restricted spectral band and can be of the continuous or pulsed type. Source 9 is such that it produces an intensity-modulated emission. In preferred, but non-limitative manner, the emission is continuous and pulse modulation takes place at a given frequency F2, differing from that of F1 produced by reticles 2 in passive operation. Thus, the demodulation corresponding to F2 can be by filtering only. The values F1 and F2 are selected first. In the case of a pulsed laser, the modulation can be carried out, for example, according to a binary code with pulse suppression or phase inversion of the carrier frequency and the demodulation uses a corresponding decoding circuit.

The arrangements permitting bimodal operation are essentially produced at the spatial filtering reticles and the processing circuits.

The sectors forming the reticles are alternately opaque and transparent with respect to the useful radiation to be detected in the passive mode. They are designed in such a way as to be all transparent to the laser radiation in the semi-active mode, this being brought about by making the opaque sectors in such a way that they constitute an interference optical filter which transmits a very fine spectral band corresponding to the wavelength of the laser. The reticles can be produced in accordance with FIG. 5, which shows a section along the line A-B of FIG. 3 using a support disk 12 made from transparent material for the radiation frequency provided for the two modes, e.g. glass, and by forming the sectors 11 by depositing in coating. The deposits can for example be produced by vacuum evaporation.

FIG. 6 shows an embodiment of the processing and deviation measurement circuits in the case of a continuous laser modulated at a frequency F2. The circuits used in passive operation are referred to hereinafter and comprise four amplifying circuits 50-1 to 50-4, a deviation measurement circuit 51 for producing difference channels $\Delta x$, $\Delta y$ and the sum channel $\Sigma$, amplifying circuits 52-1 and 52-3, demodulation circuits 53-1 to 53-3 of the digital servo-controlled filter type controlled from a circuit 54 to be tuned to the modulation frequency F1 resulting from the disk rotation speed (FIG. 3), synchronous demodulating circuits 55-1 and 55-2 receiving the filtered sum signal and low pass filter circuits 56-1 and 56-2 which perform a post-integration. Moreover, the gain control of the amplifiers and preamplifiers is obtained by applying the signal of the filtered sum channels to a level detector 58, then to a comparator 59 with a threshold VR1. The analog output of the comparator constitutes the AGC signal. This arrangement is applicable to a homing apparatus and is described in greater detail in U.S. application Ser. No. 19697.

The arrangements provided by the invention for ensuring semi-active operation comprise a second group of selective filter circuits 60-1 to 60-3 respectively energised by the outputs of amplifiers for demodulating the modulation frequency F2 of the laser signal transmitted back by the illuminated and detected object. Filters 60-1 to 60-3 are also preferably of the digital servo-controlled type, controlled by a circuit 61 in such a way as to adjust the tuning to the selected laser frequency. The latter may, for example, comprise a read-only memory 61 receiving from the operator the display of the modulation code (frequency F2 in this example) of the attached radiator. Memory 61 supplies the corresponding tuning control digital signals to filters 60-1 to 60-3. The two filters of each channel are connected downstream across a switching circuit 62-1, 62-2, 62-3 respectively for the selection of one or other of these according to the operating mode. The control of the switching circuits takes place from a mode choice circuit 63. This decision circuit 63 can be such that it ensures an external priority selection of the passive or semi-active modes for guiding the homing apparatus or for producing an internal selection in the absence of the external selection, the internal selection being based on quality criteria relative to the signals received, these being infrared signals in the passive mode and laser signals in the semi-active mode. For example, the laser mode having the priority, a laser echo signal loss leading to the passage from 1 to 0 of the digital output S11 of comparator 59 automatically brings about the passage into the passive IR mode and vice versa. In the represented version, the signal SE constitutes an external priority control, its value 1 or 0 being transmitted to the switches via circuit 63, which can easily be realised from an OR gate.

The configuration of the circuits described hereinbefore permits, for example, a bimodal operation—passive IR 3 to 5$\mu$m and modulated continuous laser 3.8 $\mu$m. On envisaging the same operation with a laser having short pulses, the detector remains common for the two modes, but electronic processing must be duplicated. The diagram of FIG. 7 gives the general construction having a IR processing unit 21 like that described for passive operation, a laser processing unit 22 for the laser signal, a mode selection circuit 23 and a switching circuit 24 for selecting the IR or laser deviation measurement analog data as a function of the choice made. The processing unit 22 must permit the sampling of peak pulse levels at the laser rate in order to obtain the signals necessary for the evaluation of the deviation measurement data. A construction of this type is described in French patent application No. 74,40035 of Dec. 6th 1974, published under No. 2,293,714. The decision circuit 23 ensures, as hereinbefore, an external priority selection of one or other mode by the signal SE and an internal selection as a function of the quality of the signals received during tracking (passage from 1 to 0 of the digital signal S11 in the presence of an echo, or an equivalent signal S12 produced by the unit 22 in laser mode). The output S13 of the decision circuit control switch 24 for sampling the deviation signals, EGP and ESP of the IR channel in the passive mode or the EGL and ESL signals of the laser channel in the semi-active mode.

In the above embodiments, the laser wavelength is included in the passive operating band. The choice of a laser wavelength outside said band can be envisaged by duplicating the detection and processing of the signals.

FIG. 8 shows a detector device arrangement making it possible to separate the laser detection and the IR detection with a view to bispectral operation. The IR detection is carried out by the above-described system 3-4 (FIG. 4) cooled by a cryostat 18. The laser detection is effected by a second four quadrant detector 14 formed by a layer of laser radiation-sensitive material and deposited on the front of the cold filter 3. This embodiment is suitable for a bimodal and bispectral operation IR passive 3 to 5 $\mu$m and laser YAG 1.064 $\mu$m. The respective outputs of the detectors are transmitted to separate processing units like circuits 21 and 22 in the case of a pulse laser emission. For the envisaged operation, the detecting coating 14 can be of silicon (Si), the detecting 4 of indium antimonide (In Sb) and the filtering coating IR 3 of silicon (Si).

The improvements described hereinbefore have shown how easy it is to transform a photoelectric direction finder system initially provided for the passive infrared mode into a system working in the semi-active laser mode, without it being necessary to modify the optomechanical structure of the optical sensor. The modifications in the case of a homing apparatus in no way affect the reception optics which may or may not be carried by a gyroscope, or the intermediate deviation measurement optics, or the detector and its cryostat, or the gyroscope and its control electronics as well as its starting device. Moreover, most of the processing electronics remains unchanged.

The materials used for forming the detector or detectors 4-14 and the objectives 1 and 15 are selected in accordance with the laser line and the passive operating band in order to ensure a satisfactory compatability of the spectral sensitivity parameters of the detectors and the optical transmission parameters with the wavelengths provided. The laser illuminator can be of the D.F. type (deuterium fluoride, 3.8 $\mu$m), YAG (1.064 $\mu$m) or $CO^2$ (10.6 $\mu$m) etc. The optics can be of SCHOTT IRG 11 glass, silicon or germanium, or conventionally glass in the visible range. The detectors can be of In Sb, Si, PbS, Hg Cd Te, Pb Sn Te, etc.

In the case of continuous laser emission, the laser modulation frequency is selected outside the modulation frequency range used by the reticles to obtain a good decoupling of the two modes and eliminate the influence of the background radiation in the laser mode. It is obvious that the modulations can be affected according to more complex codes and demodulated by matched filtering or correlation or decoding.

The electronic switching operations of the operating mode can be realised in the case of a homing apparatus as a function of the following criteria: manual switching of the authoritative operational choice to one or other mode prior to use, or automatic switching during use as a function of the quality of the signals, or prior switching to a preferred mode which is maintained during use, whilst the corresponding signal has a sufficient quality.

What is claimed is:
1. A photoelectric direction finder system for the detection and the location of a light radiating target, of the type comprising an optical reception and focussing objective, a revolving disk rotated in the focal plane of the objective and provided with reticles formed from transparent and opaque zones for producing a modulation whose frequency is linked with the rotation speed, an optical filter, a photodetector device for the modulated radiation and circuits for the processing and deviation measurement of the detected signals, comprising demodulating circuits and producing deviation signals which are representative of the angular offsetting of the target relative to a reference axis, and in which an intermediate deviation measurement objective is positioned between the reticles and the detector, the latter being of the four quadrant type for producing the deviation signals from the respective signals of the quadrants and consecutively separating the deviation measurement function from the modulating and spatial filtering function produced by the reticles, wherein the reticles are determined transparent to the radiation produced by an auxiliairy laser illuminator modulated with a modulation which is separate from that produced by the reticles and wherein it comprises additional processing circuits for processing the detected laser signals, as well as circuits for switching and selecting passive and semi- active operating modes for delivering the corresponding deviation measurement data.

2. A system according to claim 1, wherein the reticles are such that the opaque zones constitute an interference filter which is only transparent to laser radiation, with the remaining zones being transparent for both operating modes.

3. A system according to claim 2, wherein the reticles are formed by a planar support, which is transparent for both modes and on one face of which is depositied a material forming the opaque zones in the passive mode and the said interference filter in the semi-active mode.

4. A system according to claim 1, in which the processing and deviation measurement circuits comprise four reception channels from the four quadrant detector and processed by summation in a circuit for producing the difference signals $\Delta x$, $\Delta y$ and deviation measurement signal $\Sigma$, the latter being respectively transmitted to three demodulation circuits corresponding to the modulations created by the reticles, the system being intended to operate in semi-active mode with a continuous emission laser illuminator, wherein the additional processing circuits comprise three circuits for the demodulation of the laser modulation, respectively energised by the signal $\Delta x$, $\Delta y$ and $\Sigma$ and connected by their output, as well as reticle demodulation circuits respectively connected to three channel switching circuits controlled from a decision circuit.

5. A system according to claim 4, wherein the laser demodulation circuits are constituted by digitally servo-controlled tunable filters controlled by a circuit as a function of the modulation frequency of the laser illuminator.

6. A system according to claim 1 for operation in the semi-active mode with a pulse laser illuminator, wherein the processing and deviation measurement circuits comprise a first unit for the passive mode and a second unit for the semi-active mode, as well as a mode selection circuit which controls a switching circuit for delivering the deviation signals of the corresponding unit.

7. A system according to claim 6, wherein the four detection channels from the detector supply the two processing units in parallel.

8. A system according to claim 6, in which the laser illuminator emits in a spectral band external of the detection band provided in the passive mode, wherein the detector device is constituted by two four quadrant detectors for respectively supplying the two processing units.

9. A system according to claim 8 and comprising a cryostat device, a four quadrant infrared detector and in the front of the detector a deposited coating of a material which forms the said optical filter in the IR band provided in the passive mode, wherein the four quadrant laser detector is formed by a layer deposited on the front of the cold filter.

10. A system according to claim 1, or 6, or 8, wherein means are provided for relative movement of the assembly comprising the optical reception objective and the reticles means with respect to the assembly comprising the intermediate objective and the detector device, by rotation round an instantaneous center of rotation which coincidence substantially with the center of the said detector device.

* * * * *